United States Patent
Boss et al.

(10) Patent No.: US 9,648,046 B2
(45) Date of Patent: *May 9, 2017

(54) DYNAMIC ADJUSTMENT OF AUTHENTICATION POLICY

(71) Applicant: International Business Machines Corporation, Armonk, NY (US)

(72) Inventors: Gregory J. Boss, Saginaw, MI (US); Andrew R. Jones, Round Rock, TX (US); C. Steven Lingafelt, Durham, NC (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,275

(22) Filed: Feb. 16, 2016

(65) Prior Publication Data

US 2016/0164922 A1 Jun. 9, 2016

Related U.S. Application Data

(63) Continuation of application No. 14/270,957, filed on May 6, 2014, now Pat. No. 9,286,453.

(51) Int. Cl.
*G06F 17/00* (2006.01)
*H04L 29/06* (2006.01)
(Continued)

(52) U.S. Cl.
CPC .............. *H04L 63/20* (2013.01); *G06F 21/31* (2013.01); *G06Q 50/01* (2013.01); *H04L 63/08* (2013.01); *H04L 63/083* (2013.01); *H04L 63/102* (2013.01)

(58) Field of Classification Search
CPC ....... H04L 63/20; H04L 63/08; H04L 63/083; H04L 63/102; G06F 21/31; G06Q 50/01
(Continued)

(56) References Cited

U.S. PATENT DOCUMENTS 8,555,357 B1 * 10/2013 Gauvin ................. G06F 21/577
380/286
9,055,090 B2 * 6/2015 Delatorre ............ H04L 63/1441
(Continued)

OTHER PUBLICATIONS

Herve Debar, Enabling automated threat response through the use of a dynamic security policy; HALL, year: 2009; p. 1-31.*

*Primary Examiner* — Monjour Rahim
(74) *Attorney, Agent, or Firm* — Cantor Colburn LLP; Kurt Goudy (57) ABSTRACT

A computer-implemented method for managing an authentication policy for a user on a network of an organization includes determining at least one social media attribute of the user, and a social media risk value is assigned based on the at least one social media attribute of the user. The method further includes determining at least one network activity risk attribute of the user, and a network activity risk score is assigned based on the at least one network activity risk attribute. A current risk assessment score of the user is calculated based on the social media risk value and the network activity risk value. An authentication policy for the user is determined based on the current risk assessment score.

20 Claims, 3 Drawing Sheets

(51) Int. Cl.
*G06F 21/31* (2013.01)
*G06Q 50/00* (2012.01)

(58) Field of Classification Search
USPC .............................................. 726/1
See application file for complete search history.

(56) References Cited

U.S. PATENT DOCUMENTS

| | | | | |
|---|---|---|---|---|
| 2012/0011559 | A1* | 1/2012 | Miettinen | G06F 21/31 726/1 |
| 2012/0260209 | A1* | 10/2012 | Stibel | G06Q 30/018 715/780 |
| 2013/0091351 | A1* | 4/2013 | Manges | H04L 9/14 713/153 |
| 2013/0104206 | A1* | 4/2013 | Waghmare | H04M 15/70 726/6 |
| 2013/0191481 | A1* | 7/2013 | Prevost | H04L 12/1859 709/206 |
| 2013/0333032 | A1* | 12/2013 | Delatorre | H04L 63/1441 726/23 |
| 2014/0379801 | A1* | 12/2014 | Gupta | H04L 67/306 709/204 |

* cited by examiner

DYNAMIC ADJUSTMENT OF AUTHENTICATION POLICY

DOMESTIC PRIORITY

This application is a continuation of U.S. patent application Ser. No. 14/270,957, filed May 6, 2014, the disclosure of which is incorporated by reference herein in its entirety.

BACKGROUND

The present disclosure relates generally to managing authentication policies, and more specifically, to a system for dynamically adjusting an authentication policy for a user.

Before granting a user access to premises of a business or to resources on a computer network, an authentication process is performed to confirm the user's identity. Authentication may require the verification of something that the user has (e.g., an identification card), something the user knows (e.g., a password), and/or something the user inherently is or does (e.g., a biometric identifier). Typically, a business organization has the same authentication policy for all members of the organization.

SUMMARY

According to an embodiment of the present invention, a computer program product for managing an authentication policy for a user on a network of an organization is provided. The computer program product includes a computer readable storage medium having program instructions embodied therewith. The program instructions readable by a processing circuit cause the processing circuit to perform a method. The method includes determining at least one social media attribute of the user, the at least one social media attribute including at least one of: how many social media accounts the user has, how many social media postings the user has made, how many social media friends the user has, and one or more associations of social media friends of the user. A social media risk value is assigned based on the at least one social media attribute of the user. The method further includes determining at least one network activity risk attribute of the user, the at least one network activity attribute including at least one of: a number of devices that the user uses to access the network, a type of device that the user uses to access the network, and an operating system running on a device that the user uses to access the network. A network activity risk score is assigned based on the at least one network activity risk attribute. A current risk assessment score of the user is calculated based on the social media risk value and the network activity risk value. An authentication policy for the user is determined based on the current risk assessment score.

According to another embodiment of the present invention, a computer system for managing an authentication policy for a user on a network of an organization is provided. The computer system includes a memory having computer readable instructions and a processor configured to execute the computer readable instructions. The instructions include determining at least one social media attribute of the user, the at least one social media attribute including at least one of: how many social media accounts the user has, how many social media postings the user has made, how many social media friends the user has, and one or more associations of social media friends of the user. A social media risk value is assigned based on the at least one social media attribute of the user. The instructions further include determining at least one network activity risk attribute of the user, the at least one network activity attribute including at least one of: a number of devices that the user uses to access the network, a type of device that the user uses to access the network, and an operating system running on a device that the user uses to access the network. A network activity risk score is assigned based on the at least one network activity risk attribute. A current risk assessment score of the user is calculated based on the social media risk value and the network activity risk value. An authentication policy for the user is determined based on the current risk assessment score.

According to a further embodiment of the present invention, a method for managing an authentication policy for a user on a network of an organization is provided. The method determining at least one social media attribute of the user, the at least one social media attribute including at least one of: how many social media accounts the user has, how many social media postings the user has made, how many social media friends the user has, and one or more associations of social media friends of the user. A social media risk value is assigned based on the at least one social media attribute of the user. The method further includes determining at least one network activity risk attribute of the user, the at least one network activity attribute including at least one of: a number of devices that the user uses to access the network, a type of device that the user uses to access the network, and an operating system running on a device that the user uses to access the network. A network activity risk score is assigned based on the at least one network activity risk attribute. A current risk assessment score of the user is calculated based on the social media risk value and the network activity risk value. An authentication policy for the user is determined based on the current risk assessment score.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Most business organizations (e.g., corporations, enterprises, etc.) have the same authentication policies for all members of the organizations. For instance, a corporation may have the same requirements for password strength that apply to all employees of the corporation. In reality, the same password strength requirements for all employees of the corporation may not serve well to protect corporation's data because not all employees are exposed to the same security risks and the data that different employees can access have different confidentiality levels. For example, a chief financial officer (CFO) of the corporation may have knowledge and access to the corporation's key financial data and travel with a smartphone and a laptop. A helpdesk employee of the corporation may have access to the company's resources only via a corporation's desktop computer connected to the corporation's private network when the employee is inside the company's premises. In such an example, the CFO may need stronger password requirements.

Embodiments described herein are directed to methods, systems and computer program products that dynamically maintain a user's current risk level based on at least the user's organizational role and historic behavior and adjust the user's authentication policy based on changes in the current risk level. An authentication policy for a user is a combination of authentication requirements imposed on the user in order for the user to be authenticated.

Figure 1:
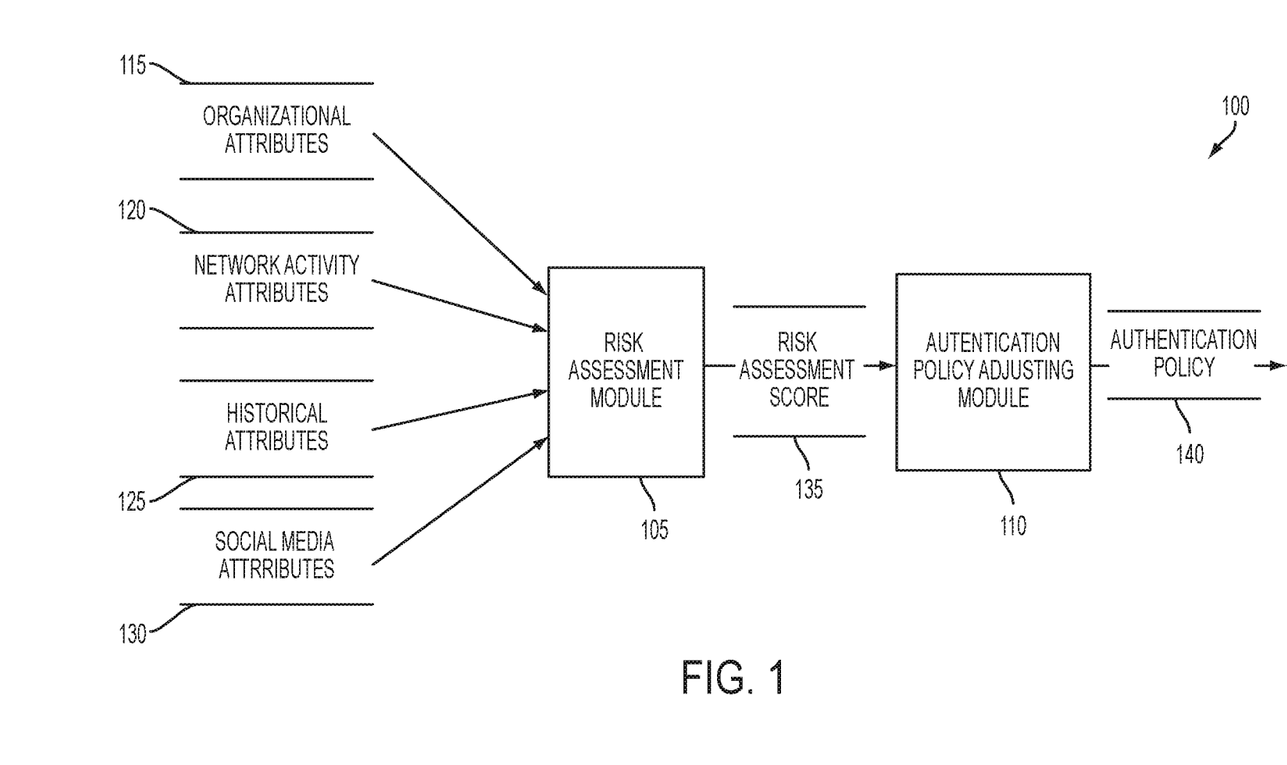
FIG. 1 depicts a block diagram of an authentication policy management system according to an embodiment.

FIG. 1 depicts a block diagram of an authentication policy management system 100 in accordance with an exemplary embodiment of the invention. The authentication policy management system 100 includes a risk assessment module 105 and an authentication policy adjusting module 110.

The risk assessment module 105 takes as inputs several different attributes of a user and assesses the attributes to determine the user's security risk that relates to a degree of protection for the information which the user may have access to or possess. In an embodiment, the risk assessment module 105 is configured to quantify individual risks associated with individual attributes of the user and to generate an overall security risk score for the user from the quantified individual risks.

In an embodiment, the attributes of the user may be categorized into organizational attributes 115, network activity attributes 120, historical attributes 125, and social media attributes 130. The organizational attributes 115 of a user are the attributes that the user has as a member of an organization (e.g., an employee of a corporation). The organizational attributes 115 may indicate the type and sensitivity of information that the user is able to access or possess as a member of the organization, as well as risk of exposing the information. The risk assessment module 105 assesses each organizational attribute of the user and assigns an appropriate risk value. For instance, the organizational attributes 115 includes an organizational role of a user in an organization (e.g., a corporation). The organizational role may be represented by a title (e.g., a CFO, a vice president, a manager, etc.) of the user, a number of persons reporting to the user, a level in the organization hierarchy at which the user is positioned, etc. The risk assessment module 105 assigns different risk values for different organizational roles. For instance, the risk assessment module 105 assigns a bigger risk value for an organizational role that is represented by, e.g., a CFO, a larger number of reporting persons, or a higher position in the organizational hierarchy. Conversely, the risk assessment module 105 assigns a smaller risk value for an organizational role that is represented by, e.g., a helpdesk representative, a smaller number of reporting persons, or a lower position in the organizational hierarchy.

The organizational attributes 115 may also include communication counterparts of the user—e.g., other members of the organization with whom the user have exchanged emails. The risk assessment module 105 assigns a bigger or smaller risk value depending on, e.g., the positions of the counterparts in the organizational hierarchy. The organizational attributes 115 may also include a frequency of travel of the user as a member of the organization. The more frequent the user travels, the higher risk value the risk assessment module 105 assigns to this attribute of the user. The organizational attributes 115 may also include whether the user has signed a non-disclosure agreement with the organization. The risk assessment module 105 may assign a lower risk value to this attribute if the user has signed a non-disclosure agreement. As can be recognized, the sources of the organizational attributes 115 may include human resources database of the organization, the user's email account, calendar, telephone log, etc., which the organization may legitimately access.

The network activity attributes 120 of a user relate to user's network activities or behavior. The network activity attributes 120 may indicate the risk of exposing the information that the user is able to access or possess. For instance, the network activity attributes 120 may include a number of devices that the user uses to access or store the information. The risk assessment module 105 assigns a higher risk value for a user who uses more devices than another user who uses a single device. The network activity attributes 120 may also include the type of a device (e.g., a mobile device such as a smartphone, a tablet, a laptop, and a stationary device such as a desktop and a work station, etc.) that a user uses. The risk assessment module 105 assigns a higher risk value to this attribute if the user has a mobile device. The network activity attributes 120 may include the software applications and operating systems (OS's) that the user's device(s) run. The risk assessment module 105 assigns a higher risk value for those devices that run applications or OS's that are known to be prone to hacking or viruses. The network activity attributes 120 may include the type of a network (e.g., a corporate intranet, a public network, etc.) that a user's device uses to access or store the information. The risk assessment module 105 assigns a higher risk value when the user's device is frequently on a free Wi-Fi network. As can be recognized, the sources of the network activity attributes 120 may include network logs and the user's device(s) which the organization may legitimately access.

The historical attributes 125 relate to the user's past behavior that indicate riskiness of exposing the information that the user may access and possess. For instance, the historical attributes 125 include a number of security violations that the user has committed. The security violations may include loss of a device that the user used to access the information, a remote wipeout of such a device, a password reset, a user account lockout, etc. The risk assessment module 105 assigns higher risk values for higher numbers of such incidents. As can be recognized, the sources of the historical attributes 125 may include network logs or other records about those incidents.

The social media attributes 130 of a user relate to the user's activities in the social media sites (e.g., Facebook, Twitter, LinkedIn, etc.). For instance, the social media attributes 130 includes a number of postings (e.g., a number of tweets, a number of Facebook comments) that the user writes in the social media sites. The risk assessment module 105 assigns a risk value that is proportional to the number of postings that the user writes. The social media attributes 130 include a number of social media accounts that the user has. The risk assessment module 105 assigns a risk value that is proportional to the number of social media accounts that the user has. The social media attributes 130 may also include a number of associations (e.g., Facebook friends, LinkedIn connections, etc.) that the user has in the user's social media sites. The risk assessment module 105 assigns a risk value that is proportional to the number of associations or visitors. The social media attributes 130 may include whether the associations are of the persons that are members of competing business organizations (e.g., a rival corporation). The risk assessment module 105 assigns a higher risk value to the user if the associations include members of competing business organizations.

The sources of the social media attributes 130 include the social media site(s) of which the user has accounts and the user. Different jurisdictions may have different legal measures for allowing or prohibiting gathering such social media activity information of individuals. An organization for which the authentication policy management system 100 runs may gather the social media attributes 130 within the legal limits. For instance, the social media attributes of a user may be gathered only if they are publicly available or only if the user agrees to release such attributes to the organization.

It is to be noted that the above four categories are exemplary categories into which the attributes of the user may be grouped and are not an exclusive list of categories. Also, an attribute may be grouped into more than one category. In an embodiment, the attributes 115-130 are gathered and processed by one or more systems (not shown) from one or more sources of the attributes and are supplied to the authentication policy management system 100. That is, in such an embodiment, the authentication policy management system 100 obtains the attributes indirectly from the sources of the attributes. Alternatively or conjunctively, the authentication policy management system 100 obtains the attributes directly from the sources of the attributes. In such an embodiment, some or all of the attributes 115-130 may be gathered and processed by one or more other modules (not shown) of the authentication policy management system 100.

In an embodiment, the risk assessment module 105 is configured to generate a risk assessment score 135 for a user from the risk values assigned to different attributes of the user. The risk assessment module 105 may employ any suitable mathematical scheme to generate the risk assessment score from the risk values. For instance, in an embodiment, the risk assessment module 105 may set the risk assessment score to a sum of all risk values. In another embodiment, the risk assessment module 105 may set the risk assessment score to a mean of the risk values. In an embodiment, the risk assessment module 105 imposes upper and/or lower limits on the risk assessment score based on the organizational role of a user. For instance, when the user is a helpdesk staff member of a corporation, the risk assessment module 105 imposes an upper limit on this user's risk assessment score. Similarly, when the user is a CFO of the corporation, the risk assessment module 105 imposes a lower limit on this user's risk assessment score. As can be recognized, the lower limit and the upper limit on the risk assessment score relate to a minimum level and a maximum level of authentication policy, respectfully. The risk assessment module 105 sends the risk assessment score 135 to the authentication policy adjusting module 110.

The authentication policy adjusting module 110 is configured to adjust the authentication policy 140 for a user based on the risk assessment score 135 and the attributes of the user. In an embodiment, the authentication policy adjusting module 110 adjusts the authentication policy by imposing a different combination of authentication requirements for a different risk assessment score. As the assessment score for a user changes, the policy adjusting module 110 changes the authentication policy of the user according to the changing risk assessment score 135 of the user. The authentication policy 140 of a user is applied to an authentication process performed by another system (not shown) or another module (not shown) of the authentication policy management system 100 when the user attempts to be authenticated.

In an embodiment, the authentication requirements for a user may include an authentication mechanism that the user should use, an authentication strength of the authentication mechanism, a frequency of authentication, a number of challenge questions, an authentication credential change environment, a verification mechanism for change of authentication credentials, etc. The types of authentication mechanisms may include a password associated with a user identifier (e.g., a user login password), an identification card or tag (e.g., a radio frequency identifier (RFID) tag), a passcode, a pattern, a biometric information of the user (e.g., face recognition, fingerprint, retina scan, etc.) which the organization may implement.

The authentication strength of an authentication mechanism may include, e.g., a required length of a password, a required number of numeric characters and/or capital letters in a password, a required probability of matching biometric data, etc. The frequency of authentication specifies a number of times that the user has to be re-authenticated during a communication session (e.g., in one login session).

The number of challenge questions defines a number of questions that the user has to answer correctly in other to be authenticated. In an embodiment, the challenge questions supplement other authentication mechanism (e.g., a password). That is, for example, the user has to provide correct answers to the challenge questions in addition to providing the correct password.

The authentication credential change environment defines an environment in which the user is allowed to change an authentication credential. For example, the authentication credential change environment may specify that the user can change the user password only via a computer that is physically located in the premises of the organization and connected to the organization's private network.

The verification mechanism for the change of authentication credentials specifies a mechanism for validating the credential change. For instance, the verification mechanism may specify that the user is required to take a picture and to email it to a number of pre-designated contacts who have to verify that the person in the picture is actually the user requesting to change the credentials.

Figure 2:
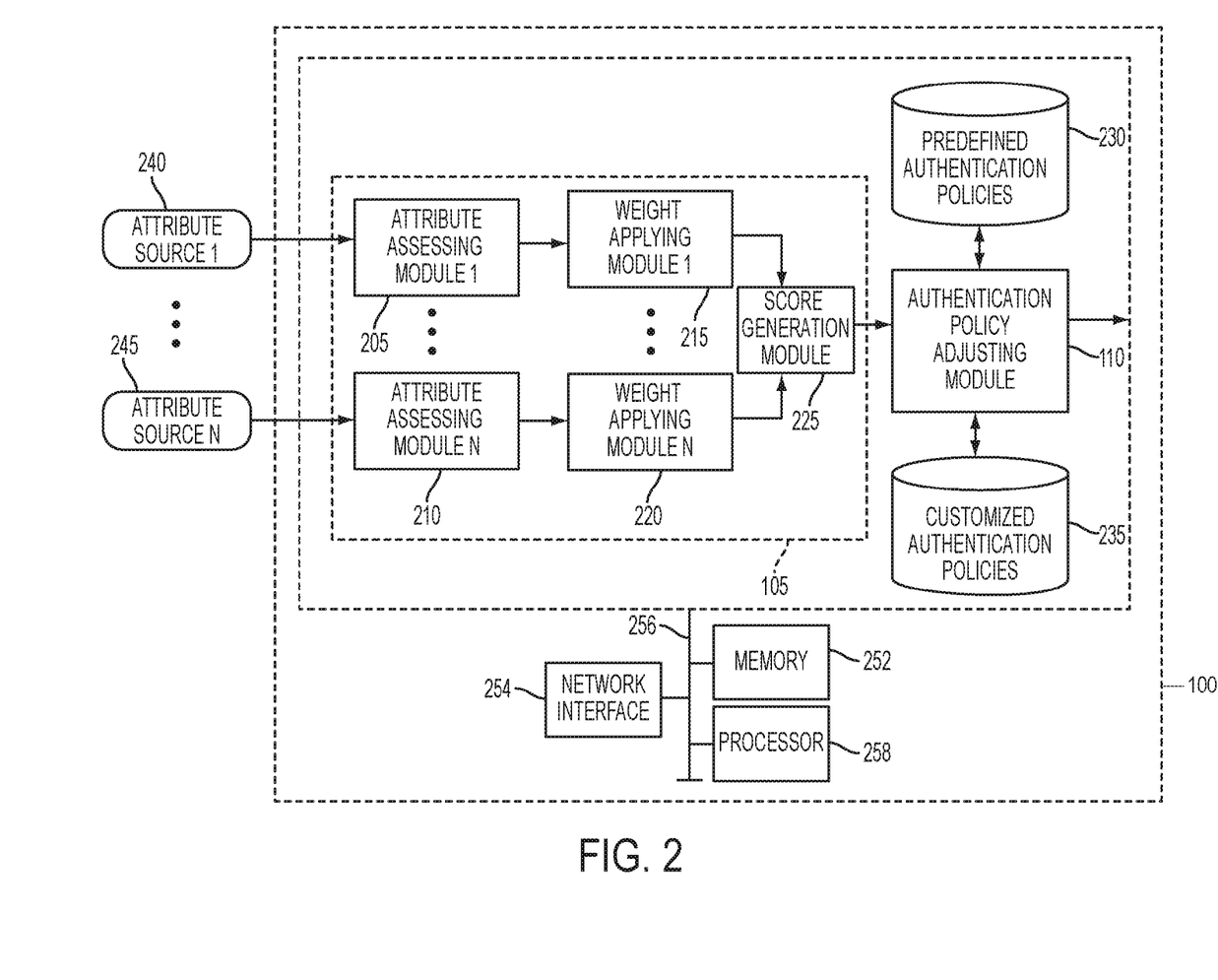
FIG. 2 depicts a block diagram of the authentication policy management system according to another embodiment.

FIG. 2 depicts a block diagram of the authentication policy management system 100 in accordance with an exemplary embodiment of the invention. The authentication policy manager system 100 includes the risk assessment module 105 and the authentication policy adjusting module 110. In an embodiment, the authentication policy manager system 100 further includes predefined authentication policies 230 and customized authentication policies 235.

In an embodiment, the risk assessment module 105 includes several sub-modules. Specifically, the risk assessment module 105 includes attribute assessing modules 205 through 210. Each attribute assessing module is configured to assess a user attribute (e.g., one of the attributes 115-130 described above by reference to FIG. 1) and to quantify a risk for the attribute. Each attribute assessing module obtains a corresponding user attribute directly from one or more of the attribute sources 240 through 245 or indirectly from other systems (not shown) or other modules (not shown) of the authentication policy management system 100 that gather and process the user attribute.

In an embodiment, the attribute assessing modules 205 through 210 obtain up-to-date user attributes from the attribute sources 240 through 245 in order to maintain an up-to-date risk assessment score for the users. In order to obtain up-to-date user attributes, the attribute assessing modules 205 through 210 may periodically (e.g., every minute, every hour, etc.) pull the corresponding user attributes directly or indirectly from the attribute sources 240 through 245. Alternatively or conjunctively, the attribute sources 240 through 245 may be configured to push the attributes directly or indirectly to the attribute assessing modules 205 through 210, periodically or whenever the user attributes change.

The risk assessment module 105 may also include weight applying modules 215 through 220. Each weight applying module (e.g., the weight assignment module 215) applies a weight to the risk value generated by the corresponding attribute assessing module (e.g., the attribute assessing module 205). In an embodiment, the weight assignment modules 215 through 220 are configurable by the organization, more specifically an administrator of the organization for which the authentication policy management system 100 runs. The weight assignment modules 215 through 220 allow different organizations to apply different weights to different user attributes to meet different security objectives or preferences of the organizations.

In an embodiment, the score generation module 225 generates a risk assessment score for each user from the weighted risk values for the user received from the weight applying module 215 through 220. The score generation module 225 employs suitable mathematical or statistical models to generate the risk assessment score from the weighted risk values. For instance, in an embodiment, the score generation module 225 may set the risk assessment score to a sum of all weighted risk values. In another embodiment, the risk assessment module 105 may set the risk assessment score to a mean of the weighted risk values. The score generation module 225 sends the generated risk scores for the users to the authentication policy adjusting module 110.

The authentication policy adjusting module 110 is configured to adjust the authentication policy (i.e., the combination of the authentication requirements) for each user when the risk assessment score for the user changes as one or more of the user attributes change. In an embodiment, the authentication policy adjusting module 110 selects one of the predetermined authentication policies 230 based on the risk assessment score for the user and sets the authentication policy for the user to the selected predetermined authentication policy. In an embodiment, the organization may predetermine multiple different authentication policies 230, associated with one or more assessment scores. In another embodiment, one authentication policy is predetermined for a range of risk assessment scores. As a simplified example of such an embodiment, risk assessment values may be an integer value between one through ten. For a user with a risk assessment score below three, the authentication policy for the user is set to a first authentication policy, which requires, e.g., standard company password length and complexity. For a user with a risk assessment score between four and seven, the authentication policy for the user is set to a second authentication policy, which requires, e.g., a longer and more complex password and more frequent change of the password. For a user with a risk assessment score between eight and ten, the authentication policy for the user is set to a third authentication policy, which requires, e.g., a biometric verification along with even longer and more complex password and a change of password allowed only in a defined physical area or network.

In an embodiment, the authentication policy adjusting module 110 adjusts the authentication policy for a user by modifying the authentication policy for a user when the user's risk assessment score changes instead of by switching between predetermined authentication polices 230. In such an embodiment, the authentication policy for the user may be stored as one of the customized authentication policies 235. In an example of modifying the authentication policy of a user, the authentication policy adjusting module 110 keeps track of individual risk assessment values for individual attributes of the user. The authentication policy adjusting module 110 may change only some of the authentication requirements defined in the authentication policy based on a change with a particular attribute of the user. For instance, a risk assessment value for an attribute that relates to a number of failed attempts to authenticate changes because the user fails to provide a correct password more than a threshold number of times. In such case, the authentication policy adjusting module 110 adjusts the authentication policy for the user by requiring the user to provide answers to a set of challenge questions while leaving other authentication requirements of the authentication policy intact.

In an embodiment, the authentication policy adjusting module 110 provides the up-to-date authentication policy for a user upon receiving a request for the policy from another system (not shown) or another module (not shown) of the authentication policy management system 100. The system or module that requests the authentication policy utilizes the authentication policy when an attempt to be authenticated as the user is made.

As used herein, the terms module and sub-module may refer to an application specific integrated circuit, an electronic circuit, a processor (shared, dedicated, or group) and memory that executes one or more software or firmware programs, or a combinational logic circuit in a system. For example, in an embodiment, the modules 105, 110, 205 through 210, 215 through 220, and 225 may be communicatively connected (e.g., through a bus 256) to a memory 252 to store and retrieve data such as the predefined authentication policies 230, the customized authentication policies 235, the attributes 115-130, the risk assessment score 135, and the authentication policy 140 (FIG. 1). The modules 105, 110, 205 through 210, 215 through 220, and 225 may also use a processor 258 to perform their operations. The modules 105, 110, 205 through 210, 215 through 220, and 225 may also be communicatively connected to a network interface 254 to exchange data with other systems and the attribute sources 240 through 245. In an embodiment, the modules 105, 110, 205 through 210, 215 through 220, and 225 may be combined or further partitioned. Also, the modules 105, 110, 205 through 210, 215 through 220, and 225 may be implemented in more than one server in a distributed fashion. That is, the authentication policy management system 100 may be implemented in more than one server in a distributed fashion.

Figure 3:
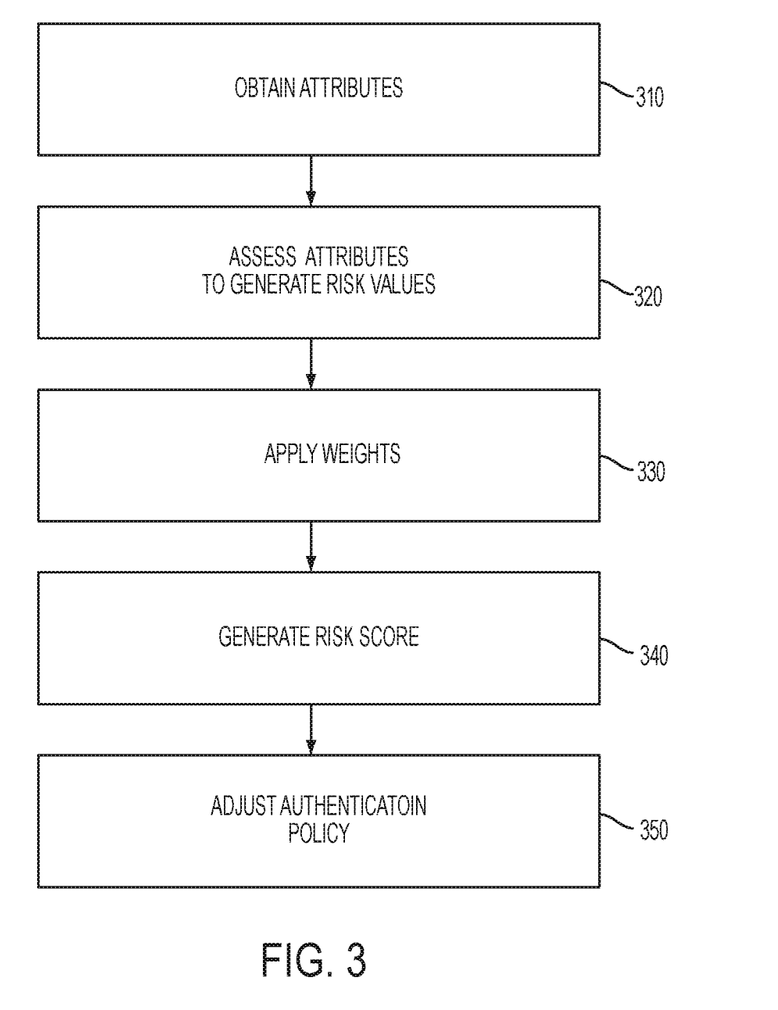
FIG. 3 depicts a process flow for adjusting an authentication policy for a user.

FIG. 3 depicts a process flow for adjusting an authentication policy for a user. In an embodiment, the process shown in FIG. 3 is performed by the authentication policy management system 100. At block 310, the authentication policy management system 100 obtains user attributes for a user from several attribute sources (e.g., the attribute sources 240 through 245 in FIG. 2). In an embodiment, the authentication policy management system 100 obtains the user attributes directly from the sources. In another embodiment, the authentication policy management system 100 indirectly obtains the user attributes via one or more other systems that gathers and processes the attributes and supplies the attributes to the authentication policy management system 100. In an embodiment, the authentication policy management system 100 keeps obtaining the current user attributes by pulling the attributes from the sources or other systems or by requesting the sources or other systems to push the attributes to the authentication policy management system 100.

At block 320, the authentication policy management system 100 assesses the individual user attributes and generates a risk value for each of the attributes for a user. At block 330, the authentication policy management system 100 applies different weights to different attributes for the user. In an embodiment, an administrator of an organization for which the authentication policy management system 100 run configures the authentication policy management system 100 to assign different weights to the different attributes based on the security objectives or preferences of the organization.

At block 340, the authentication policy management system 100 generates a risk assessment score for the user. The authentication policy management system 100 of different embodiments generates the risk assessment score for the user differently. For instance, the authentication policy management system 100 sets the risk assessment score to the sum the individual risk values. In another embodiment, the authentication policy management system 100 sets the risk assessment score for the user to an average risk value of all weighted risk values generated from all the user attributes. The authentication policy management system 100 may utilize any suitable mathematical or statistical scheme to generate the risk assessment score based on the individual risk values.

At block 350, the authentication policy management system 100 adjusts the authentication policy for the user based on the risk assessment score generated at block 340. In an embodiment, the authentication policy management system 100 selects a predetermined authentication policy based on the risk assessment score for the user. That is, the authentication policy management system 100 adjusts the authentication policy by switching between different predetermined authentication policies whenever the risk assessment score for the user changes. Alternatively or conjunctively, the authentication policy management system 100 modifies the authentication policy of a user when one or more user attribute changes. The authentication policy is accessed by a system that authenticates the user into the organizational network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for managing an authentication policy for a user on a network of an organization, the computer program product comprising a non-transitory computer readable storage medium having program instructions embodied therewith, the program instructions readable by a hardware processor to cause the processing circuit to perform a method comprising:
    determining at least one social media attribute of the user, the at least one social media attribute being related to activities of the user on one or more social media websites and comprising at least one of: how many social media accounts the user has on the one or more social media websites and how many social media postings the user has made on the one or more social media websites;
    assigning a social media risk value based on the at least one social media attribute of the user;
    determining at least one network activity risk attribute of the user, the at least one network activity attribute comprising at least one of: a number of devices that the user uses to access the network, a type of device that the user uses to access the network, and an operating system running on a device that the user uses to access the network;
    assigning a network activity risk value based on the at least one network activity risk attribute;
    calculating a current risk assessment score of the user based on the social media risk value and the network activity risk value;
    determining the authentication policy for the user based on the current risk assessment score; and
    providing to the user access to the network of the organization upon detecting that the user has met requirements of the authentication policy determined for the user based on the risk assessment score.

2. The computer program product of claim 1, the method further comprising:
    determining an organizational role of a user within an organization; and
    assigning an organizational risk value for the user based on the organizational role of the user, wherein a first organizational role within the organization results in a higher organizational risk value than a second organizational role within the organization;
    wherein the calculating the current risk assessment score is further based on the organizational risk value for the user.

3. The computer program product of claim 2, wherein assigning the organizational risk value for the user based on the organizational role of the user comprises assigning the organizational risk value based on at least one of a level in an organizational hierarchy at which the user is positioned, a number of persons reporting to the user, a department to which the user belongs, and a job title of the user.

4. The computer program product of claim 1, the method further comprising:
    determining a history of historical violations committed by the user; and
    assigning a historical risk value based on the history of historical violations committed by the user;
    wherein the calculating the current risk assessment score is further based on the historical risk value for the user.

5. The computer program product of claim 4, wherein the historical violations include at least one of a failed authentication attempt, a loss of a device used to access the network, a remote wipeout of a device used to access the network, a password reset, and a user account lockout.

6. The computer program product of claim 1, wherein the authentication policy specifies at least one of a length of a password, a number of numeric characters in a password, a number of capital letters in a password, a frequency of required re-authentication during a communication session, a frequency of password changes required, a number of security questions to be asked, and an environment in which an authentication mechanism can be changed.

7. A computer system for managing an authentication policy for a user on a network of an organization:
    a memory having computer readable instructions; and a hardware processor configured to execute the computer readable instructions, the computer readable instructions comprising:

determining at least one social media attribute of the user, the at least one social media attribute being related to activities of the user on one or more social media websites and comprising at least one of: how many social media accounts the user has on the one or more social media websites and how many social media postings the user has made on the one or more social media websites;

assigning a social media risk value based on the at least one social media attribute of the user;

determining at least one network activity risk attribute of the user, the at least one network activity attribute comprising at least one of: a number of devices that the user uses to access the network, a type of device that the user uses to access the network, and an operating system running on a device that the user uses to access the network;

assigning a network activity risk value based on the at least one network activity risk attribute;

calculating a current risk assessment score of the user based on the social media risk value and the network activity risk value;

determining the authentication policy for the user based on the current risk assessment score; and providing to the user access to the network of the organization upon detecting that the user has met requirements of the authentication policy determined for the user based on the risk assessment score.

8. The computer system of claim 7, the computer readable instructions further comprising:

determining an organizational role of a user within an organization; and assigning an organizational risk value for the user based on the organizational role of the user, wherein a first organizational role within the organization results in a higher organizational risk value than a second organizational role within the organization;

wherein the calculating the current risk assessment score is further based on the organizational risk value for the user.

9. The computer system of claim 8, wherein assigning the organizational risk value for the user based on the organizational role of the user comprises assigning the organizational risk value based on at least one of a level in an organizational hierarchy at which the user is positioned, a number of persons reporting to the user, a department to which the user belongs, and a job title of the user.

10. The computer system of claim 7, the computer readable instructions further comprising:

determining a history of historical violations committed by the user; and assigning a historical risk value based on the history of historical violations committed by the user;

wherein the calculating the current risk assessment score is further based on the historical risk value for the user.

11. The computer system of claim 10, wherein the historical violations include at least one of a failed authentication attempt, a loss of a device used to access the network, a remote wipeout of a device used to access the network, a password reset, and a user account lockout.

12. The computer system of claim 7, wherein the authentication policy specifies at least one of a length of a password, a number of numeric characters in a password, a number of capital letters in a password, a frequency of required re-authentication during a communication session, a frequency of password changes required, a number of security questions to be asked, and an environment in which an authentication mechanism can be changed.

13. The computer system of claim 7, wherein the authentication policy specifies a type of authentication mechanism that user is required to use.

14. A computer-implemented method for managing an authentication policy for a user on a network of an organization, the computer-implemented method comprising:

determining at least one social media attribute of the user, the at least one social media attribute being related to activities of the user on one or more social media websites and comprising at least one of: how many social media accounts the user has on the one or more social media websites and how many social media postings the user has made on the one or more social media websites;

assigning a social media risk value based on the at least one social media attribute of the user;

determining at least one network activity risk attribute of the user, the at least one network activity attribute comprising at least one of: a number of devices that the user uses to access the network, a type of device that the user uses to access the network, and an operating system running on a device that the user uses to access the network;

assigning a network activity risk value based on the at least one network activity risk attribute;

calculating a current risk assessment score of the user based on the social media risk value and the network activity risk value;

determining the authentication policy for the user based on the current risk assessment score; and providing to the user access to the network of the organization upon detecting that the user has met requirements of the authentication policy determined for the user based on the risk assessment score.

15. The computer-implemented method of claim 14, the computer readable instructions further comprising:

determining an organizational role of a user within an organization; and assigning an organizational risk value for the user based on the organizational role of the user, wherein a first organizational role within the organization results in a higher organizational risk value than a second organizational role within the organization;

wherein the calculating the current risk assessment score is further based on the organizational risk value for the user.

16. The computer-implemented method of claim 15, wherein assigning the organizational risk value for the user based on the organizational role of the user comprises assigning the organizational risk value based on at least one of a level in an organizational hierarchy at which the user is positioned, a number of persons reporting to the user, a department to which the user belongs, and a job title of the user.

17. The computer-implemented method of claim 14, the computer readable instructions further comprising:

determining a history of historical violations committed by the user; and assigning a historical risk value based on the history of historical violations committed by the user;

wherein the calculating the current risk assessment score is further based on the historical risk value for the user.

18. The computer-implemented method of claim 17, wherein the historical violations include at least one of a failed authentication attempt, a loss of a device used to access the network, a remote wipeout of a device used to access the network, a password reset, and a user account lockout.

19. The computer-implemented method of claim 14, wherein the authentication policy specifies at least one of a length of a password, a number of numeric characters in a password, a number of capital letters in a password, a frequency of required re-authentication during a communication session, a frequency of password changes required, a number of security questions to be asked, and an environment in which an authentication mechanism can be changed.

20. The computer-implemented method of claim 14, wherein the authentication policy specifies a type of authentication mechanism that user is required to use.

* * * * *